United States Patent [19]
McDonough

[11] Patent Number: 6,084,218
[45] Date of Patent: Jul. 4, 2000

[54] SPA HEATER TEMPERATURE CONTROL CIRCUIT

[75] Inventor: William B. McDonough, Huntington Beach, Calif.

[73] Assignee: ITT Manufacturing Enterprises, Inc., White Plains, N.Y.

[21] Appl. No.: 09/318,658

[22] Filed: May 25, 1999

[51] Int. Cl.[7] .................................................. H05B 1/02
[52] U.S. Cl. .......................... 219/508; 219/501; 219/510; 219/481; 219/519; 4/504; 361/103
[58] Field of Search ...................... 219/519, 497, 219/501, 505, 508–510, 494, 481; 4/541.2, 504; 361/15, 18, 103

[56] References Cited

U.S. PATENT DOCUMENTS

| | | | |
|---|---|---|---|
| 4,245,148 | 1/1981 | Gisske et al. | 219/492 |
| 4,593,177 | 6/1986 | Trostler | 219/328 |
| 5,585,025 | 12/1996 | Idland | 219/497 |
| 5,932,127 | 8/1999 | Maddox | 219/492 |

*Primary Examiner*—Mark Paschall
*Attorney, Agent, or Firm*—Knobbe, Martens, Olson & Bear, LLP

[57] ABSTRACT

A heater assembly for use with spas, hot tubs and the like, includes a control circuit which controls the application of electrical power to the heater. A control circuit controls application of power to the heater in response to a thermostat setting, the flow of water in the spa system and in response to a high limit temperature. When the high limit temperature is exceeded, electrical power to the heater is removed. Electrical power to the heater cannot be restored until power to the entire system is turned off and then back on. The control circuit is mounted on the heater and includes spring-loaded standoffs which maintain the temperature sensors in good thermal contact with the body of the heater.

19 Claims, 3 Drawing Sheets

SPA HEATER TEMPERATURE CONTROL CIRCUIT

BACKGROUND OF THE INVENTION

1. Field of the Invention

This invention generally relates to spas and hot tubs and more specifically to control systems and circuits for the heaters utilized in such spas and hot tubs.

2. Description of the Related Art

Whirlpool spas and hot tubs typically include a tub for holding water, a pump for circulating the water and a heater. Usually the pump draws in water from the tub, forces it through the heater and out through jets in the tub, thereby circulating the water and causing it to be heated by passing it through the heater. For safety purposes, the heater is typically provided with some type of flow sensor control device that allows the heater to only operate when water is flowing through the system. In addition, the heater also typically includes a thermostat control device and a high limit temperature control device which turns the heater off if the temperature of the water exceeds a safe limit, such as 119° F.

Safety regulations often require that the high limit temperature control operate such that when it is tripped, it must be re-set, much like a circuit breaker. That is unlike, for example, the flow sensor control which can cycle on and off repeatedly in response to water flowing and not flowing through the system. In most current heaters, there are simple electromechanical controls which are responsive to the lack of water flow, excessive temperature and act as a thermostat. These are typically configured as a circuit including the heater element, a bimetallic thermostat, a bimetallic high limit thermostat and a pressure or flow switch, all connected in series with a source of line voltage, typically 115 volts AC. The bimetallic thermostat is configured to turn on and off in response to the temperature of the water. The bimetallic high limit thermostat is configured to trip when the high limit temperature is exceeded. The bimetallic high limit thermostat must be manually re-set after it has been tripped. When the pump is activated by an air switch or an electronic switch, water flows through the heater and activates the flow switch. This allows power to flow through the thermostat switches and the heater.

A shortcoming of such a system is that when an over temperature condition occurs, which can be due to the filling of the bathtub with hot water over the maximum temperature of the high limit thermostat, the high limit thermostat will "trip" and disconnect the heater. The heater will not operate until the high limit thermostat is reset. Frequently, the heater is located underneath the tub without easy user access. Also, typically there is no visible indication that the high limit thermostat has been tripped. Often the user does not realize that the high limit thermostat has been tripped and instead believes the system is broken.

SUMMARY OF THE INVENTION

The present invention provides a heater control circuit which is automatically reset when power is shut-off to the system.

The heater control circuit controls the application of electrical current to the heater subject to the operation of a flow switch, a thermostat control device in a high limit temperature shut off device. When a predetermined high limit temperature is exceeded, the circuit removes power from the heater and will not permit power to be reapplied to the heater until power to the control circuit has been turned off and then turned back on. This provides the needed safety feature of turning the heater off when a high limit temperature is exceeded while providing a simple and convenient reset feature.

In one aspect of the invention, the high limit temperature control device includes a thermostatic control device in the form of an integrated circuit and a silicon controlled rectifier which provides a "crowbar" function. A crowbar function or crowbar circuit locks into a state once it is triggered and remains in that state as long as power is provided to the crowbar circuit. The removal of power from the crowbar circuit resets the crowbar circuit such that when power is restored to the crowbar circuit, it is in the state opposite to the locked state. When the high limit temperature is exceeded, the high limit temperature control device sends a signal to the SCR which turns off a relay and thereby prevents the application of power to the heater. The SCR will continue to keep the relay off until power to the entire circuit is turned off and then restored. Thereby, the high limit temperature control device can be conveniently reset by turning power to the entire system off then back on.

These and other features and advantages of the invention will be readily apparent to those skilled in the art from the following detailed description of the embodiments of the invention with reference to the accompanying drawings.

DETAILED DESCRIPTION OF THE PREFERRED EMBODIMENTS

The invention provides a control circuit for an electric heater which can be used for a tub or spa or other similar water heating applications. Spas hot tubs and similar systems are generally referred to herein as spas. The control circuit turns power to the heater on and off in response to flowing water and, in response to a thermostat to maintain a preselected water temperature. The circuit shuts power off when the water temperature exceeds a preset high temperature limit. When power is shut off in response to a water temperature above the limit, power to the entire system must be turned off then back on to reset the control circuit.

Figure 1:
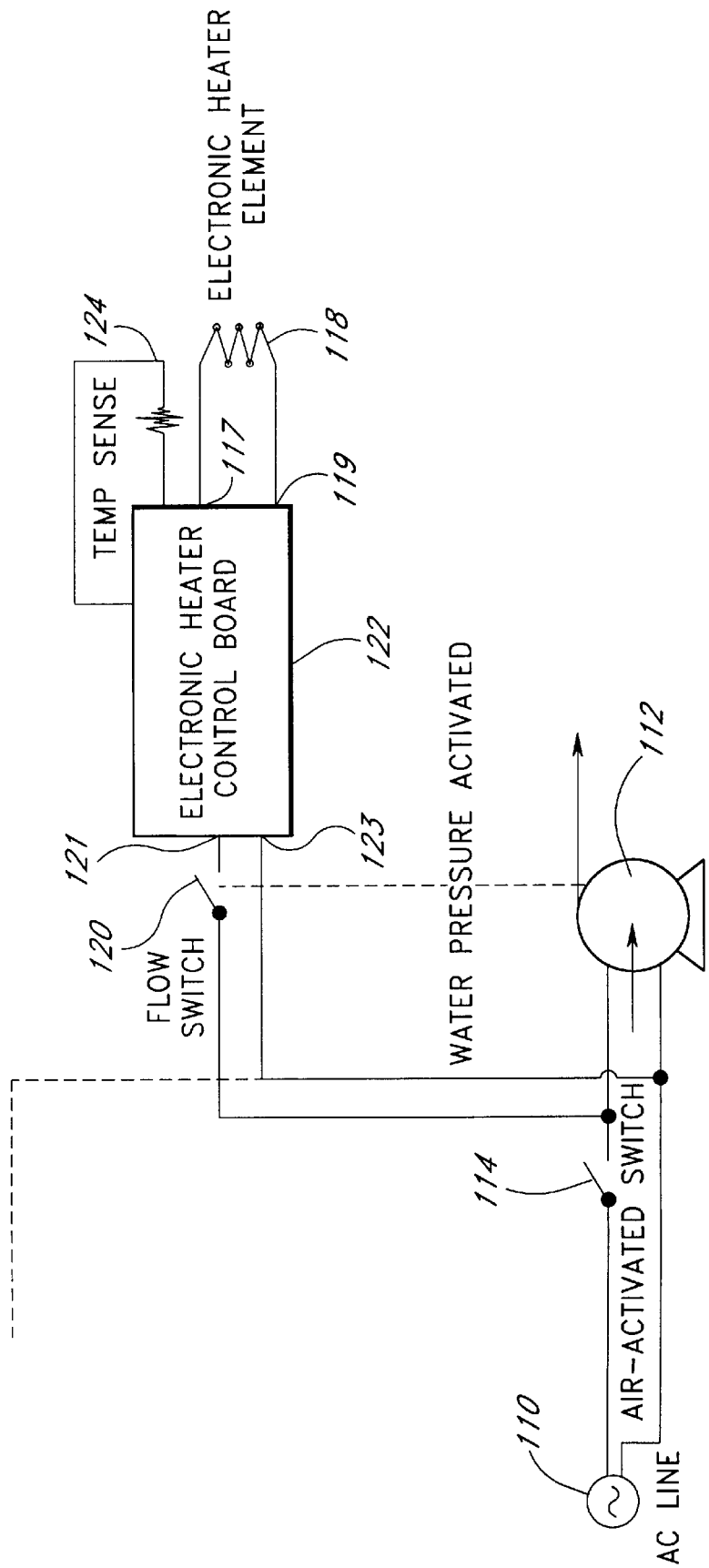
FIG. 1 is a block diagram of a pump and heater combination employing the invention.

Referring to FIG. 1, the overall flow of electrical power in a spa or hot tub system employing an embodiment of the invention will be described. An alternating current source 110, such as a typical wall outlet, provides electrical power to a pump 112. A switch 114 controls the power to the pump 112 and to a heater 118. The switch can be an air switch, for example. In this example, the heater 118 is an electrical resistance type heater. Alternatively, the spa may utilize a gas heater.

A flow switch 120 allows current to flow to the heater control circuit 122 when water is flowing in the circulation system of the tub. Various types of suitable flow switches which turn on when water is flowing in the system and off when the flow ceases are known to those of ordinary skill in the field. When pump 112 is operating properly, a flow of water caused by the pump activates flow switch 120 which then allows electrical current to flow to the heater control circuit 122.

The heater control circuit 122 controls the application of electrical current to the heater 118 subject to the flow switch 120. The heater control circuit 122 provides a thermostat function to turn power to the heater on and off to regulate the temperature of the heated water within desired temperature range and provides a high limit temperature shut-off safety function. The heater control circuit 122 includes one or more temperature sensors indicated generally as 124 which provide the heater control circuit 122 with an indication of the temperature of the water passing through the heater 118. If the temperature sensor 124 indicates that the temperature of the water passing through the heater 118 has exceeded the high temperature limit, heater control circuit 122 will shut off power to the heater 118. The heater control circuit 122 will not restore power to the heater until the control circuit is reset. The heater control circuit 122 is reset by turning power to the circuit 122 off (controlled by switch 114) and then back on. When the switch 114 is turned on, the pump causes water to flow which causes the flow switch 120 to turn on and thereby provide power to the circuit 122.

On the other hand, if the temperature sensor indicates that the temperature of the water is above the desired temperature, or temperature range, controlled by the thermostat function but below the high limit temperature, electrical power to the heater 118 will be turned off until the temperature sensor indicates that the temperature of the water in the heater 118 passes below a desired temperature. At that time, electrical power will again be provided to the heater 118. Of course, one of ordinary skill in the art could assemble numerous circuits to carry out these functions.

Figure 2:
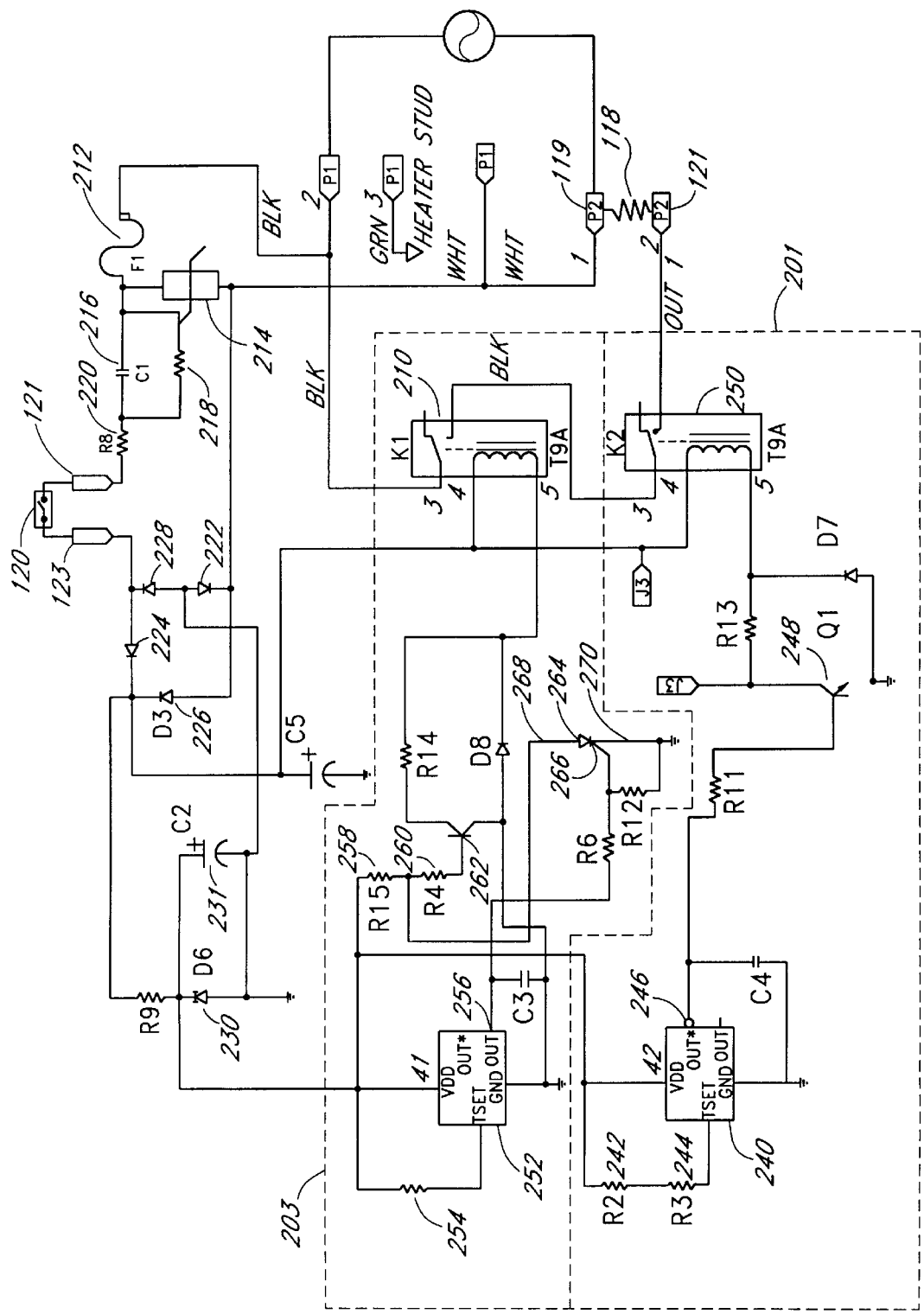
FIG. 2 is a detailed circuit diagram of a circuit embodying aspects of the invention.

FIG. 2 is a schematic depiction of an embodiment of the heater control circuit 122. The input voltage, typically 115 volts AC, is applied to one terminal 119 of the heater 118 and to the normally open relay 210 which is in series with the normally open relay 250. The relay 250 completes the circuit to that terminal 121 of the heater 118. The operation of relay 210 (acting as a switch mechanism) is controlled by the high limit temperature shut off circuit generally indicated at 203 while operation of relay 250 (acting as a switch mechanism) is generally controlled by the thermostat circuit generally indicated as 201. Those control circuits will be described in more detail below. However, generally speaking, thermostat circuit 201 closes relay 250 when the temperature of the water in the heater is below the predetermined range of the thermostat and leaves relay 250 open at all other times. High limit temperature shut off circuit 203 closes relay 210 when the temperature of the water in the heater is below the preset high limit temperature. When the high limit temperature is exceeded, circuit 203 causes relay 210 to open and does not allow relay 210 to be closed until power to circuit 203 has been turned off for a preselected time period and then turned back on. That type of switching requiring such a reset can be referred to as a "crowbar".

The input voltage is coupled via a one amp fuse 212. A metal oxide varistor (MOV) 214 is coupled in parallel with the input voltage to act as a noise and line transient suppressing device. MOV's are available from numerous manufacturers including Panasonic.

A capacitor (C1) 216 in parallel with a resistor (R10) 218 is used to decrease the input voltage and to limit the amount of current available to the circuit due to its impedance. The capacitor (C1) 216 can have a capacitance of 1.5 microfarrads and the resistor (R10) 218 can have a resistance of 1 M ohms. The resistor (R8) 220 is used to limit the in-rush transient current that may pass through the capacitor (C1) 216. Resistor (R8) 220 can have an impedance of 100 ohms. The current limited voltage from resistor (R8) 220 is applied to one side of the flow switch 120. When the flow switch 120 is open, no voltage is available to the rest of the circuit. Specifically, no voltage is available to the two normally open relays 210, 250 and, therefore, no voltage is available to the heater 118.

When the flow switch 120 is closed, thereby indicating that there is sufficient water flow for proper operation of the system, the limited line voltage is applied to a bridge rectifier formed by the diodes (D1) 222, (D2) 224, (D3) 226 and (D4) 228. The output of that bridge rectifier is approximately 75 volts of direct current with no load. A zener diode (D6) 230 in parallel with a capacitor (C2) 231 acts as a shunt-regulator to regulate the DC voltage (the supply voltage) applied to the circuits 201, 203 to approximately 15 volts DC. The capacitor (C2) 231 may have a capacitance of 220 $\mu$F. The foregoing circuit elements cooperate to provide regulated 15 volt DC power to the electronic elements of the circuit that will now be described. Other circuits or sources of voltage could also be used, such as commercially available power supplies.

Referring now to thermostat circuit 201 of FIG. 2, a thermostatic control device 240 receives the 15V supply voltage and is an electronic control device in the form of an integrated circuit including an on-chip temperature sensor. Such a thermostatic control device is available from Telcom Semiconductor located in San Jose, Calif., part no. TC622CPA. The thermostatic control device 240 is placed in thermal contact with the object whose temperature is to be sensed. For example, it can be in direct contact with the body of the heater which is typically representative of the temperature of the water within the heater. The control temperature for the thermostatic control device 240 is set via resistors 242 and 244 and would typically be set for approximately 104° F. For example, resistor 242 would have a resistance of 121 k ohms and resistor 244 would have a resistance of 4.02 k ohms. When the temperature being sensed is less than the set temperature (104° F.), output pin 246 produces a high logic voltage level. When the temperature being sensed exceeds the set temperature, the thermostatic control device 240 produces a low logic voltage level at the output pin 246.

A high logic level at the output pin 246 turns "on" a high-voltage transistor (Q1) 248 which acts as a closed switch when it is "on". A suitable transistor is an NPN transistor made by Zetex, part number ZTX458. Applying the high logic level to the transistor 248 enables (closes) the relay 250, which allows current to flow through that relay.

When the thermostatic control device 240 senses a temperature (via its on chip sensor) above the set temperature, the voltage on the output pin 246 goes to a low logic voltage level which turns the transistor (Q1) 248 "off". Turning the transistor (Q1) 248 "off" causes the relay 250 to turn off, thereby blocking or turning off the power to the heater 118.

A second thermostatic control device 252, within the high limit temperature shut off circuit 203, operates as the high limit temperature or high limit control device. The high limit control device 252 receives the supply voltage and is an electronic control device in the form of an integrated circuit including an on-chip temperature sensor. The high limit control device 252 can be a thermostatic control device identical to the thermostatic control device 240. The high limit control device 252 is also placed in thermal contact with the object whose temperature is to be sensed. It can be in direct contact with the body of the heater which typically is representative of the temperature of the water within the heater 118. The control temperature or the high limit temperature for the high limit control device 252 is controlled by the resistor (R1) 254. For example, a resistance of 130 kilo ohms can correspond to a high limit temperature of 114° F.

The high limit output pin 256 provides an output signal from the high limit control device 252. When the temperature sensed by the device is below the high limit, the output at the pin 256 is a low logic voltage level. A high voltage transistor (Q2) 262 is normally biased "on" via the resisters (R15) and (R4) 258, 260. The transistor 262 can be the same type as the transistor 248. When the transistor 262 is "on," the relay 210 is enabled or "on". The two relays 210, 250 in series control the application of the electrical power to the heater 118.

When the high limit control device 252 senses a temperature in excess of the high limit temperature, the output 256 goes to a high logic voltage level which switches a silicon controlled rectifier (SCR) 264 "on". When SCR 264 is switched "on", the bias voltage applied to the base of the transistor 262 is lowered (to approximately ground), which causes the transistor 262 to turn "off". That in turn causes the relay 210 to turn off, which disconnects the electrical power from the heater regardless of the state of the relay 250.

The SCR 262 operates such that once the high logic voltage level is applied to its gate terminal 266, it will remain "on" (latched "on") until the DC voltage across its other two terminals 268, 270 goes to near 0 volts. Such a circuit arrangement is sometimes referred to as a "crowbar" because it terminates normal operation of the remaining circuitry until power to the SCR is removed. In other words, once the output 256 of the high limit control device 252 goes to the high logic voltage level, the SCR 264 turns "on" which turns the transistor 262 "off", which turns the relay 210 off. This condition can only be reversed by removing power from the two terminals 268, 270 of the SCR. That is accomplished by removing power from the heater control circuit 122. In one embodiment that is accomplished by turning power to the entire system off and then back on again. The power will need to remain off to the circuit for sufficient time for the power supply capacitor 231 to discharge and thereby allow the SCR 264 to reset. Therefore, in operation when the high limit temperature is exceeded, the heater will turn off and remain off until power to the entire circuit is turned off for a sufficient amount of time for the capacitor 231 to discharge and then power is restored to the circuit.

Therefore the high limit temperature shutoff circuit 203 provides the safety features of turning the heater off when the sensed temperature exceeds the high limit. In addition, the circuit 203 provides for a convenient and easily accessible reset feature that allows the circuit 203 to be reset merely by turning power to the system off and then back on. No separate switch needs to be activated.

Figure 3:
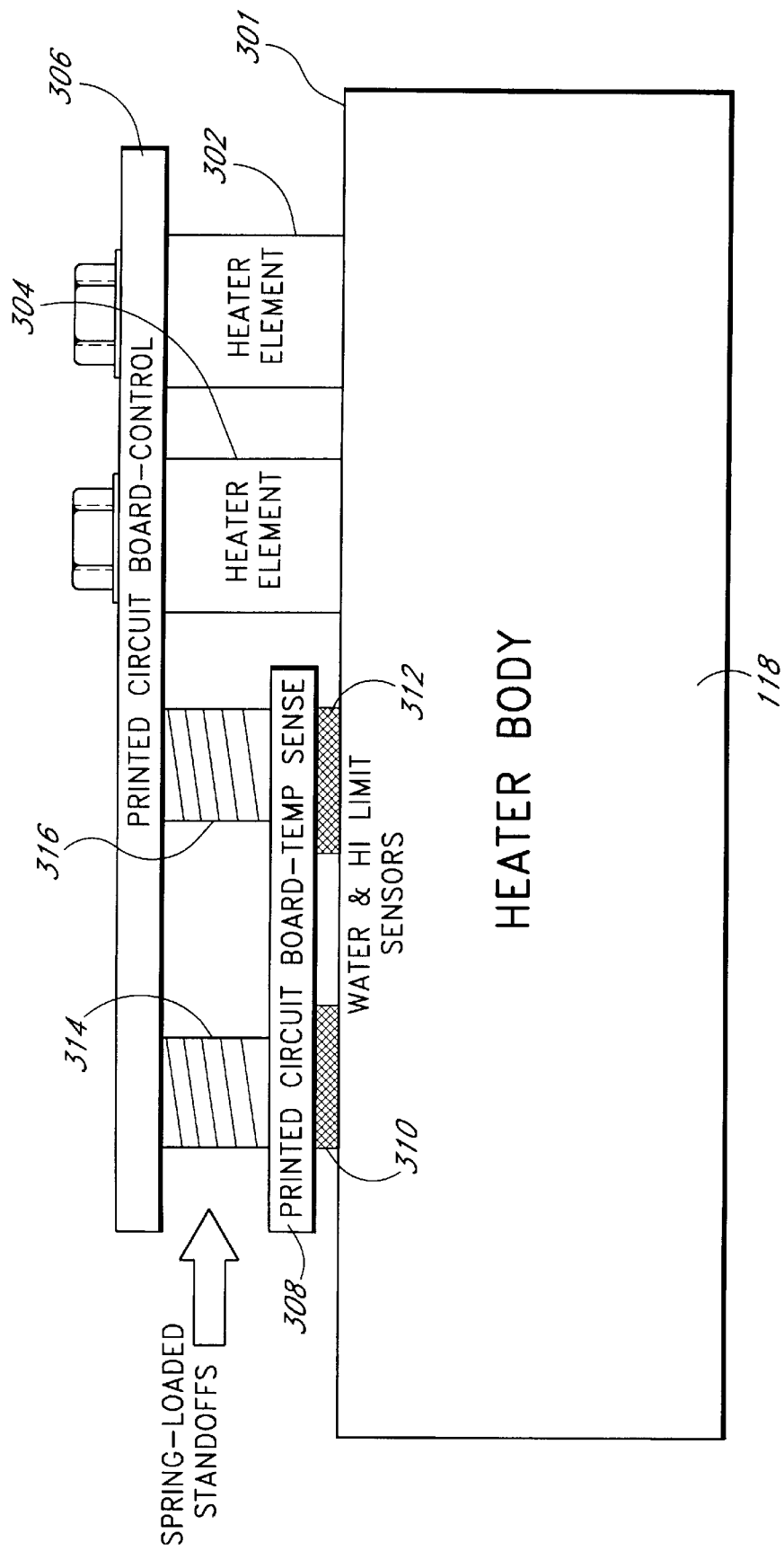
FIG. 3 is a side plan view of a mechanical arrangement of a heater employing a circuit of the present invention.

Turning now to FIG. 3, a mechanical arrangement of a heater 118 employing a circuit of the present invention is shown. The heater body 301 includes two electrical heater terminals 302, 304. A printed circuit board 306 is bolted, or fastened by other means, to the two heater terminals. The printed circuit board 306 includes most of the circuit elements depicted in FIG. 2. A printed circuit board sub-assembly 308 includes the thermostatic control device 240 and the second thermostatic control device 252. The on-chip temperature sensors 310, 312 of the two thermostatic control devices 240, 252, are shown in contract with the heater body 301. The printed circuit board sub-assembly 308 can be electrically coupled to the printed circuit board 306 via one or more ribbon cable connectors (not shown).

A pair of spring-loaded standoffs 314, 316 exert a constant force against the printed circuit sub-assembly 308 to maintain physical contact between the temperature sensors 310, 312 and the heater body. The spring-loaded standoffs assure good thermal contact and sensing. The spring-loaded standoffs 314, 316 can also accommodate for variations between the lengths of the two heater terminals 304, 302 which might otherwise cause poor contact of the sensors and the heater body if the sub-assembly 308 was more rigidly connected to the circuit board 306. In addition, different manufacturers of heaters provide different spacing between the ends of the heater terminals which results in the circuit board 306 not being parallel to the surface of the heater body. The angle between the circuit board 306 and the surface of the heater body can also be corrected or compensated for by the two spring-loaded standoffs.

The invention may be embodied in other specific forms without departing from its spirit or essential characteristics. The described embodiments are to be considered in all respects only as illustrative and not restrictive. The scope of the invention is indicated by the appended claims rather than by the foregoing description. All changes in variations which come within the meaning and range of equivalency of the claims are to be embraced within their scope.

What is claimed is:

1. A spa heater control circuit for controlling the flow of electrical power to a heater, the circuit comprising:
   at least one temperature sensor which produces a signal representative of the temperature of water within the heater;
   a high limit temperature safety shut off circuit coupled to receive the signal from said at least one temperature sensor, said high limit temperature safety shut off circuit having
      a first switch mechanism which controls the application of electrical power to the heater, and
      a crowbar circuit which will cause said first switch mechanism to stop the flow of electrical power to said heater if the signal from said at least one temperature sensor indicates that the water within the heater has exceeded a predetermined temperature and which will not allow power to be applied to the heater until power to the high limit temperature safety shut off circuit has been turned off and then turned back on again.

2. The spa heater control circuit of claim 1, further comprising:
   a thermostat circuit coupled to receive the signal from said at least one temperature sensor and having a second switch mechanism which controls the application of electrical power to the heater, the second switch mechanism being in series with said first switch mechanism.

3. The spa heater control circuit of claim 1, wherein said first switch mechanism comprises a relay.

4. The spa heater control circuit of claim 1, wherein said crowbar circuit includes a silicon controlled rectifier.

5. The spa heater control circuit of claim 1 for use with a heater having two electrical terminals, the safety circuit further comprising:
   a circuit board including at least one connector for coupling to an electrical terminal of the heater;
   a printed circuit board sub-assembly having the temperature measuring element thereon; and
   at least one spring-loaded standoff coupling the circuit board and the circuit board sub-assembly.

6. A spa system comprising:
a main switch which controls the electrical power to the spa system;
a water pump coupled to the main switch;
a heater;
a heater control circuit coupled to the heater, the heater control circuit comprising
   at least one sensor which produces a signal representative of the temperature of water within the heater;
   a high limit temperature safety shut off circuit coupled to receive the signal from the at least one sensor, the high limit temperature safety shut off circuit having
      a first switch mechanism which controls the application of electrical power to the heater, and
      a crowbar circuit which controls the first switch mechanism to stop the flow of electrical power to the heater if the signal from the at least one temperature sensor indicates that the water within the heater unit has exceeded a predetermined temperature and which will not allow power to be applied to the heater unit until power to the high limit temperature control circuit has been turned off and then turned back on again; and
   a flow switch coupled to the main switch and to the heater control circuit, the flow switch allows electrical power to flow to the heater control circuit when water is flowing in the spa system.

7. The spa heater control circuit of claim 6, further comprising:
a thermostat circuit coupled to receive the signal from said at least one temperature sensor and having a second switch mechanism which controls the application of electrical power to the heater, the second switch mechanism being in series with said first switch mechanism.

8. The spa heater control circuit of claim 7, wherein said first switch mechanism and said second switch mechanism comprise relays.

9. The spa heater control circuit of claim 6, wherein said crowbar circuit includes a silicon controlled rectifier.

10. A spa heater control circuit for controlling the flow of electrical power to a heater, the circuit comprising:
a thermostat means for sensing the temperature of the water in the heater and for turning power to the heater on and off in response the sensed temperature; and
a high limit temperature safety shut off means for sensing the temperature of the water in the heater and for turning power to the heater off if the sensed temperature has exceeded a predetermined high limit temperature and not allowing power to be applied to the heater until power to the high limit temperature control means has been turned off and then turned back on again.

11. The spa heater control circuit of claim 10, wherein said high limit temperature safety shut off means comprises a relay.

12. The spa heater control circuit of claim 1, wherein said high limit temperature safety shut off means comprises a silicon controlled rectifier.

13. A method for controlling the flow of electrical power to a heater in a spa system, comprising:
monitoring the temperature of water circulating in the spa;
stopping the flow of electrical power to the heater if the temperature of the water within the spa has exceeded a predetermined high limit temperature; and
allowing power to be applied to the heater only after power to the spa system has been turned off and then turned back on again.

14. A safety circuit for a spa heater, comprising:
a power source;
a high limit temperature sensor circuit comprising:
   a temperature measuring element which responds to the temperature of said space heater, and
   a circuit interrupter, connected in series between said power source and said spa heater, which disconnects said power source from said spa heater when the temperature of said spa heater exceeds a predetermined value; and
   a reset circuit connected to said power source which prevents reconnection of said power source to said spa heater after operation of said circuit interrupter unless said power source is turned off and then turned on.

15. The safety circuit of claim 14, further comprising:
a thermostat circuit having a temperature sensor and having a switch mechanism which controls the application of electrical power to the heater, the second switch mechanism being in series with said circuit interrupter.

16. The safety circuit of claim 15, wherein said switch mechanism comprises a relay.

17. The safety circuit of claim 15, wherein said reset circuit includes a silicon controlled rectifier.

18. The safety circuit of claim 15, wherein said circuit interrupter comprises a relay.

19. The safety circuit of claim 15 for use with a heater having two electrical terminals, the safety circuit further comprising:
a circuit board including at least one connector for coupling to an electrical terminal of the heater;
a printed circuit board sub-assembly having the temperature measuring element thereon; and
at least one spring-loaded standoff coupling the circuit board and the circuit board sub-assembly.

* * * * *